United States Patent [19]

Streett

[11] Patent Number: 4,863,208
[45] Date of Patent: Sep. 5, 1989

[54] OPENER FOR A CORVETTE REAR-SEAT STORAGE COMPARTMENT COVER

[75] Inventor: James T. Streett, Pottstown, Pa.

[73] Assignee: Street Specialty Products Inc., Pottstown, Pa.

[21] Appl. No.: 86,618

[22] Filed: Aug. 18, 1987

[51] Int. Cl.⁴ .............................................. B60R 7/04
[52] U.S. Cl. ................................ 296/37.15; 296/37.8; 292/DIG. 72
[58] Field of Search .................. 296/37.1, 37.8, 37.14, 296/37.15, 37.16; 292/DIG. 37, DIG. 72

[56] References Cited

U.S. PATENT DOCUMENTS

| | | | |
|---|---|---|---|
| 2,204,359 | 6/1940 | Hendrickson | 292/DIG. 72 |
| 2,233,278 | 2/1941 | Aldeen | 292/DIG. 72 |
| 2,559,736 | 7/1951 | Scarborough | 292/DIG. 72 |
| 2,599,277 | 6/1952 | Orr | 296/37.16 |
| 4,109,950 | 8/1978 | Amdal | 292/DIG. 72 |
| 4,256,340 | 3/1981 | Dunchock | 296/37.15 X |
| 4,544,191 | 10/1985 | Nakama | 292/DIG. 72 |
| 4,630,852 | 12/1986 | White et al. | 292/DIG. 37 |

Primary Examiner—Johnny D. Cherry
Assistant Examiner—Russell D. Stormer

[57] ABSTRACT

For a Corvette rear-seat storage compartment, a spring connected between the compartment frame and a latch on the cover and arranged when the cover is in its closed position to develop an opening force urging the cover in a direction away from the closed position. The opening force of the spring, after the latch is disengaged from the keeper on the frame and after the force depressing the latch push button is removed, causing the cover and latch to rotate upwardly away from the closed position at a rate great enough to prevent the latch from re-engaging with the keeper and at a distance sufficient so that the cover can be grasped by the fingers and moved to a fully open position.

3 Claims, 2 Drawing Sheets

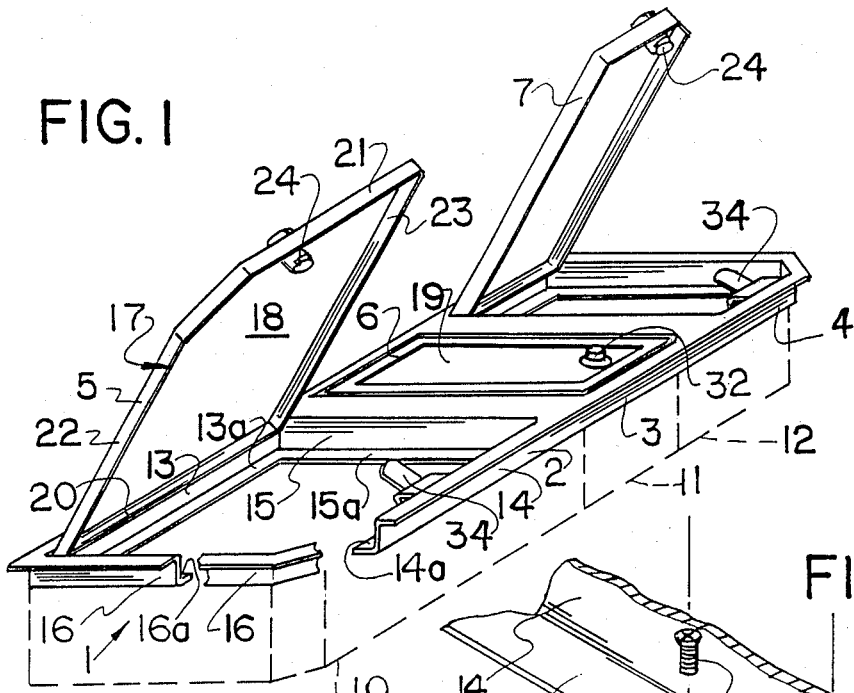
FIG. 1
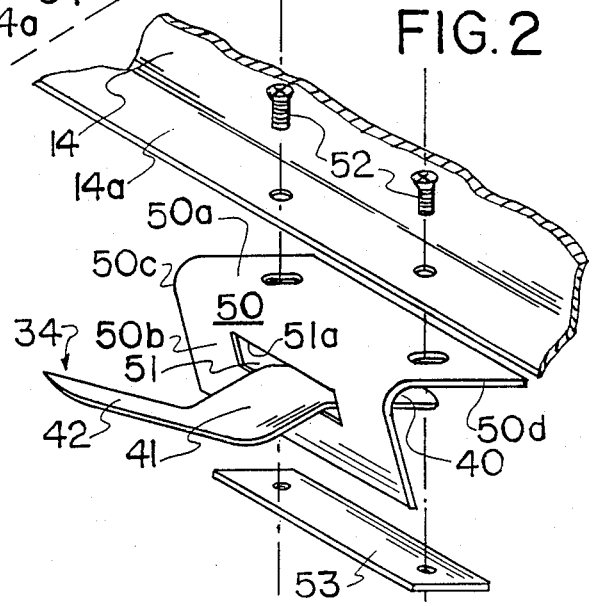
FIG. 2
FIG. 3
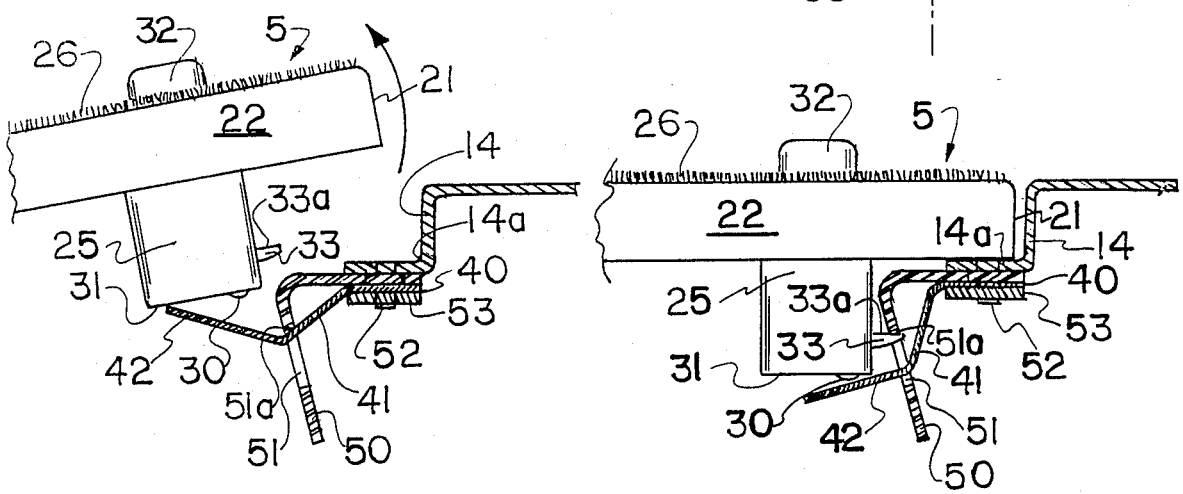
FIG. 4
FIG. 5

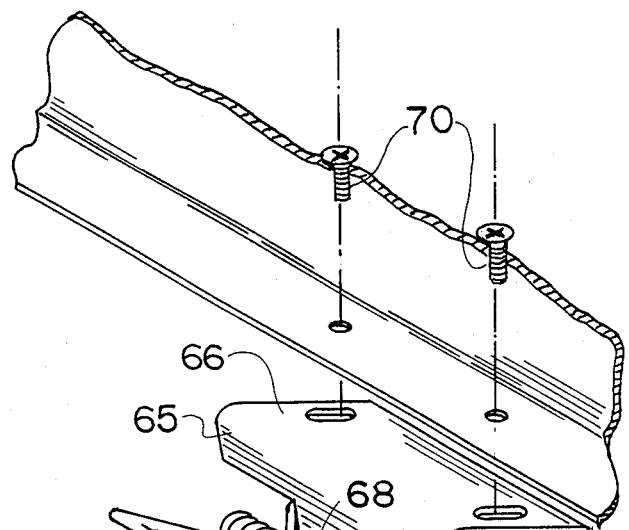
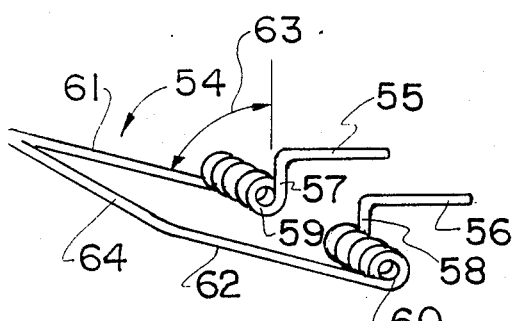
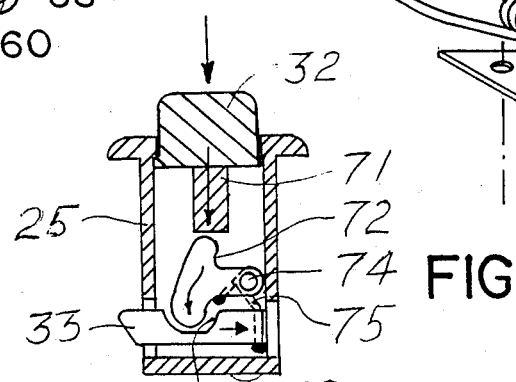
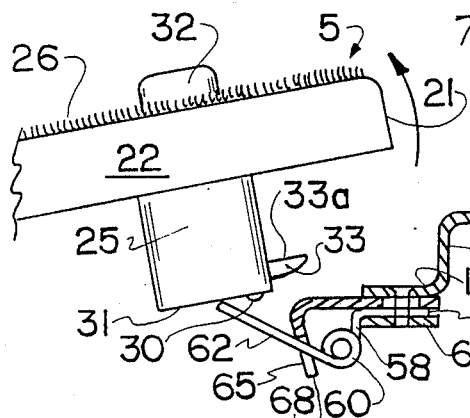
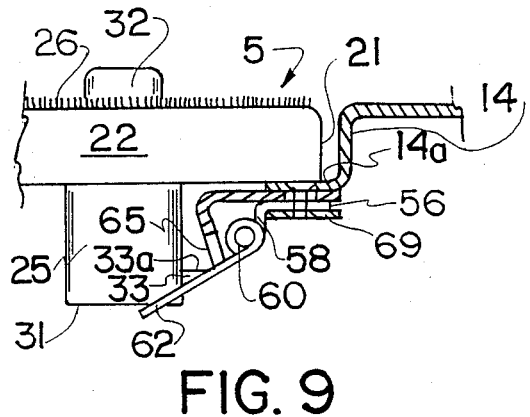

OPENER FOR A CORVETTE REAR-SEAT STORAGE COMPARTMENT COVER

This invention relates to the automotive aftermarket and in particular relates to the aftermarket for Corvette automobiles.

Corvette automobiles manufactured during the period 1968 through 1982 employ a push button actuated keeper/latch to secure the covers of the rear storage compartments. Also, the vehicles of that period employ a cover pull-up in the form of fabric or plastic loop. A loop is screw fastened to each of the rear-seat storage compartment covers. The push button is depressed with a finger of one hand to release the latch and upon release, a finger of the other hand is inserted through the cover pull-up loop to raise the cover. If a person is skillful enough, two fingers of one hand can perform the depress and lift operation.

For various reasons, the fabric or plastic loop, tends to become severed or to pull away from the screw holding the same to the cover. The severed loops are unsightly and it was and now is virtually impossible to obtain a replacement loop having the same color as the compartment cover, the latter having a color the same as the interior of the car. Where a loop disappears it becomes impossible to open the cover except by prying it up with the blade of a screw driver. To remedy the situation, the aftermarket's solution was to substitute a metal pull-up for the fabric or plastic pull-up. This metal pull-up is in the form of a stamped metal bracket having a main ring-like section which is secured to the cover by fitting under the push button bezel on the cover. The bracket also has a loop extending up from the cover and out over the compartment frame. When the finger of one hand pushes the push button to release the cover, a finger of the other hand is inserted under the pull-up loop to raise the cover. As with the fabric loop, a skillful person can perform the operation with the fingers of one hand.

While the metal pull-up functions satisfactorily to pull up a cover, there are several disadvantages: (a) it normally takes two hands to open the cover; (b) the metal pull-ups are black and therefore, rarely match the interior color scheme of the car; (c) the pull-ups extend up and outwardly and constitute rigid obstructions on the cover; and (d) they are relatively expensive.

In contrast to the above conventional copy-cat solution, the concept of this invention is to eliminate the manual cover pull-up and provide means which automatically opens the cover when the push button is depressed.

The invention will be described below in connection with the following drawings wherein:

FIG. 1 is a perspective view of a typical rear-seat storage compartment in a Corvette motor car;

FIG. 2 is an enlarged, perspective, exploded view of an automatic cover opening arrangement employed in the compartments of FIG. 1;

FIG. 3 is a perspective view of a leaf spring employed in the organization of FIG. 2;

FIG. 4 is a side elevational view partially in section illustrating the operation of the opener of FIG. 2 and showing the cover in an open position;

FIG. 5 is a side elevational view partially in section further illustrating the operation of the opener of FIG. 2 and showing the cover in closed position;

FIG. 6 is a perspective view of a wire-form spring employed in the organization of FIG. 7;

FIG. 7 is an enlarged perspective, exploded view of an automatic cover opener which may be employed in the compartments of FIG. 1;

FIG. 8 is a side elevational view partially in section illustrating the operation of the opener of FIG. 6 and showing the cover in open position; and FIG. 9 is a side elevational view partially in section further illustrating the operation of the opener of FIG. 6 and showing the cover in closed position; and, FIG. 10 is an elevational view partially in section and illustrating a typical cover latch mechanism.

Corvette motor cars of the years in question normally have three rear-seat storage compartments. A typical arrangement is shown in FIG. 1 where a frame 1 has three sections 2, 3, and 4 the sections respectively having covers 5, 6, and 7 together with the lower compartments indicated by dotted lines 10, 11, and 12.

The three sections and covers are essentially identical in construction. The section 2 is annular in configuration comprising the sides 13, 14, 15, and 16 each having an inwardly extending annular flange respectively indicated at 13a, 14a, 15a and 16a.

The cover 5 has a frame 17 and top piece 18. The top piece 18 is normally constructed of a rigid plate which supports carpet-like material color matched to the interior. The cover 6 illustrates the carpet-like material 19.

The frame 17 also has sides 20, 21, 22, and 23. The side 20 of the cover is connected to frame side 13 by pivot means not shown. The pivot means permits the cover to be rotated as between open positions (as indicated for covers 5 and 7) and a closed position wherein the sides of the cover are down in engagement with the annular flanges 13a, etc. The cover 6 is shown in the closed position.

Each cover includes latch mechanism, the latch mechanism for cover 5 being indicated at 24. With reference to FIG. 4, the latch mechanism has a housing assembly 25 extending through a clearance aperture in the top 18. The carpet-like material for the cover 5 is indicated at 26. The housing assembly has an assembly screw, the head 30 of which protrudes slightly from the bottom 31 of the housing but does not interfere with the operation of the opener springs which will be discussed later.

A manually depressible push button 32 is mounted for short reciprocating axial motion in and out of the housing 25. A latch finger 33 is also mounted for short reciprocating radial motion in and out of the housing 25. Mechanism, including a spring, inside the housing 25 is connected to the push button 32 and to the finger 33. The internal spring normally urges the push button and fingers outwardly as shown in FIGS. 4 and 5. When the button is depressed, the latch finger 33 is moved inwardly of the housing. When the pressure on the push button is released, the internal mechanism moves the push button and latch finger to the positions as shown.

The above action of the push button 32 and latch finger 33 is for locking the cover in the closed position and for releasing the lock so the cover can be rotated out of the closed position.

I will now discuss one form of the spring means by which the cover is automatically moved out of the closed position when the push button is depressed and released.

In FIG. 3 a spring 34 is in free standing condition. It is formed from flat, spring-tempered stainless steel. For descriptive purposes, the spring has a front side 35 and a back side 36. The spring has first, second, and third flat sections respectively indicated at 40, 41, and 42. The first and second sections 40 and 41 are bent around the joinder area 43 so that the surfaces on the back side 36 of the spring are oriented at an obtuse angle 46 of approximately 119°. The second and third sections 41 and 42 are bent around the joinder area 45 so that the surfaces on the front side 35 of the spring are oriented at an obtuse angle 47 of approximately 57°. The radiuses at the joinder areas 43 and 45 are respectively 0.090" and 0.230".

The spring 34 is connected between the frame section 2 and the cover 5 so that when the cover is being rotated to the closed position, the latch mechanism will contact the spring and move it to a position where the spring will develop an opening force urging the cover in a direction out of the closed position. Thus, when the latch finger 33 is disengaged from the keeper, the spring 34 functions to rotate the cover upwardly.

The opening force of the spring 34 rotates the cover at a rate great enough to prevent the latch finger from re-engaging the keeper. Also, the opening force is great enough to rotate the cover upward a distanc sufficient for the frame to be grasped by the fingers and moved to a full open position.

The foregoing operation will now be described in detail.

In FIG. 2 keeper bracket 50 has a keeper slot 51 the top edge of which forms a keeper 51a. This bracket 50 is the same bracket which is normally used in Corvette cars of the period in question. The bracket 50 is mounted underneath the flange 14a of the frame side 14 and is adapted to be secured to the underside of the flange 14a by means of bolts 52 passing through clearance holes in the flange 14a and in the keeper bracket 50 and engaging nut means formed in the retainer strip 53 which is also standard.

The section 40 of spring 34 extends through the keeper slot 51 and is disposed between the keeper bracket 50 and the retainer strip 53. It will be apparent that when the screws 52 are tightened up, the section 40 will be clamped between the retainer strip and the keeper bracket. The clamped condition of the spring 34 is shown both in FIG. 4 and FIG. 5.

When the keeper bracket is clamped on the flange 14a as above described, the keeper slot 51 is positioned so that in the closed position of the cover (FIG. 5) the keeper slot 51 receives the latch finger 33 with the top side 33a of the latch finger engaging the keeper 51a. This condition locks the cover in the closed position.

When the spring 34 is clamped as above described, the section 42 is positioned to be engaged with the bottom 30 of the housing 25 both in the closed position of the cover as shown in FIG. 5 and in the open position of the cover as shown in FIG. 4. The housing bottom 30 and section 42 make a sliding engagement without interfering with screw 30.

In FIG. 4, the spring is essentially in the same free standing condition as shown in FIG. 3. In FIG. 5, the bottom 31 of the housing has engaged the section 42 and bent both sections 42 and 43 substantially downwardly. This bending of the spring, of course, causes the same to develop an opening force against the cover which urges the cover upwardly. Upward motion of the cover is restrained by the latch finger engaging the keeper.

However, when the push button is depressed, the latch finger 33 disengages from the keeper 51a and the restraining force is removed. The spring 34 takes over and immediately causes the cover to rotate upwardly as is noted in FIG. 5.

The spring 34 is designed to function at a greater speed than the mechanism in the housing 25 which moves the finger outwardly when the force depressing the button is removed. The cover is moved rapidly upwardly so that the finger 33 cannot re-engage the keeper 51a.

Also, the spring 34 is designed to rotate the cover sufficiently upward so that the frame side 14 can be grasped by the fingers and the same rotated to a fully open position.

In FIGS. 6 and 7 I have shown another form of the spring means by which the cover is automatically moved out of closed position when the push button is depressed and released.

In FIG. 6, the spring 54 is made of wire. The first and second straight sections 55 and 56 are parallel and coplanar. The third and fourth straight sections 57 and 58 are also coplanar and parallel and are respectively bent at right angles to the sections 55 and 56. The first and second helical wound sections 59 and 60 are respectively connected to the second and third sections 57 and 58. The helical sections 59 and 60 are coaxial. Fifth and sixth straight sections 61 and 62 are respectively connected to the helical sections 59 and 60. The fifth and sixth sections are parallel and coplanar and these sections are disposed at an acute angle 63 with respect to the sections 57 and 58. The angle 63 is approximately 75°. A seventh straight section 64 connects the sections 61 and 62.

Referring to FIGS. 7 through 9, the keeper bracket 65 is of the form shown and has top 66 and side 67 which terminates in a straight edge which forms keeper 68. The sections 55, 56, 57, and 59 of spring 54 are adapted to fit up under the top 61 and side 67. A retainer strip 69 abuts the underside of the sections 55 and 56. The screws 70 in clearance holes in the flange 14a and top 66 are threaded into nuts formed in the retainer strip 69.

When the keeper bracket is clamped as above described, the keeper 68 is positioned to be engaged by the top 33a of the latch finger. This condition locks the cover in the closed position as noted in FIG. 9. Also, the section 64 of spring 54 is positioned to be engaged with the bottom 29a of the connector 29 both in the closed position of FIG. 9 and in the open position of FIG. 8. The housing bottom 31 and the section 64 make a sliding engagement.

In FIG. 8, the housing bottom 31 has bent the sections 64, 66, and 62 downwardly against the resistance generated by the helical sections 59 and 60. This develops an opening force against the cover which urges the cover upwardly. The upward motion is restrained by the latch finger 33. When the push button 32 is depressed and the latch 33 disengages from keeper 68, the restraining force is removed. The spring 54 takes over and immediately causes the cover to rotate upwardly as noted in FIG. 8.

The spring 54 is designed to function at a greater speed than the mechanism in the housing 25 which moves the finger 33 outwardly when the force depressing the button is removed. The cover is moved rapidly upwardly so that the finger 33 cannot reengage the keeper 68.

Also, the spring 34 is designed to rotate the cover sufficiently upward so that the frame side 14 can be grasped by the fingers and the same rotated to a fully open position.

Before closing I will comment on the installation of the spring 34 spring 54 and a modification of spring 54 and briefly describe the internal operation of a typical latch mechanism.

First, however, it is to be noted that in preparation for installing a spring, the screw which holds the severed fabric loop is removed. The hole in the carpet-like material is obscured simply by roughing the area with a finger.

For spring 54, it is only necessary to back off the bolts 52 so that the section 40 of the spring can be inserted through the keeper slot 51 and then between the keeper bracket 50 and retainer strip 53. The bolts are then tightened up. The bent condition of the spring 34 as previously described conditions the spring for operation without further action.

For the spring 65 it is necessary to remove the standard keeper bracket 54 and substitute the keeper bracket 65 and assemble with the spring 65 between the keeper bracket 65 and retainer strip 69 as shown. The bent condition of the spring 65 as previously described readies the same for immediate operation without further action.

The modification of spring 54 referred to provides for the spring to be used with the original equipment bracket 50. For this purpose the helical sections 59 and 60 are arranged so that they fit closely under the joinder area between top 50a and side 50b of the keeper bracket 50 and extend outwardly from the edges 50c and 50d so that the sections 61 and 62 operate closely adjacent the edges 50c and 50d. The length of section 64 is proportionately increased. Also, the sections 55 and 56 are made respectively to enter and exit the coils of the helical sections on the top side and are coplanar. The latter is different from spring 34 wherein the sections enter and exit at the bottom side. The sections 57 and 58 are eliminated or reduced in length. The helical sections are reversely wound from the winding direction in FIG. 6. The sections comparable to sections 61 and 62 are bent downwardly for purposes of proper engagement between the bottom 31 and the section comparable to section 64.

Referring to FIG. 10 the button 32 has an extension 71 which is in engagement with an actuator 72 which in turn engages a cavity 73 in the finger 33. The actuator is rotatable mounted on a pivot 74 fixed to the housing 25. A pair of wire-form springs are mounted on the pivot 74 respectively on opposite sides of the actuator. One of the springs is indicated at 75. The finger is mounted on track means (not shown) in the housing 25 for sliding motion left to right and visa versa as seen in FIG. 10.

As shown, the springs have biased the actuator 72 clockwise and the same pushes the button 32 upwardly and the finger 33 outwardly. When the button is depressed it rotates the actuator counter clockwise which causes the finger to move inwardly of the housing to the cover-release condition.

When the pressure on the button is relieved the spring rotates the actuator clockwise which causes the button to move upwardly and the finger to move outwardly to the lock condition.

In summary, with the present invention, not only are the compartment covers automatically opened, but furthermore, the unsightly loop and metal pull-ups are done away with leaving a neat, clean, flat, unobstructed storage area on top of the covers.

Claims to the leaf spring of FIG. 3 and the wire form spring of FIG. 6 are set forth in a division of this application.

I claim:

1. In a Corvette motor car having: at least one rear-seat storage compartment including an annular compartment frame having first and second sides; a cover including a cover frame having first and second sides, the first side of the cover frame being pivotally connected to the first side of the compartment frame and rotatable between open and closed positions, the closed position occurring when the second side of the cover frame engages the second side of the compartment frame, a bracket having an edge constituting a keeper mounted on the second side of the compartment frame; a latch housing mounted in a clearance aperture in the cover adjacent the second side of the cover frame and having a top portion on the top side of the cover and a bottom portion extending downwardly away from the underside of the cover, a manually depressible push button mounted in the top portion of the latch housing for reciprocating motion in and out of the latch housing, a latch finger mounted on the bottom portion of the latch housing for reciprocating motion in and out of the latch housing, mechanism inside of the latch housing connected to the push button and to the latch finger and including spring means effective to cause the latch finger to move into the housing when the push button is manually depressed and to move outwardly of the housing when the manual force on the push button is released; the finger, when the cover is in the closed position and the manual force depressing the push button is relieved, engaging said keeper to hold the cover in the closed position;

improved means for moving the cover away from the closed position when the push button is manually depressed and the latch finger disengages from the keeper edge, the improved means comprising:

spring means one end being connected to said bracket and the opposite end slidingly engaging the bottom of said latch housing and arranged when the cover is in the closed position to develop an opening force urging the cover and latch housing in a direction away from the closed position and the opening force, after the latch finger is disengaged from the keeper edge and after the force depressing the push button is removed causing the cover and latch housing to rotate upwardly away from the closed position and the opening force rotating the cover and latch housing upwardly at a rate great enough to prevent the latch finger form re-engaging the keeper edge and the opening force also causing the cover and latch housing to rotate upwardly away from the closed position a distance sufficient so that the cover frame can be grasped by the fingers.

2. The improvement of claim 1 wherein said spring is a leaf spring.

3. The improvement of claim 1 wherein said spring is a wire form.

* * * * *